(12) United States Patent
Kim et al.

(10) Patent No.: US 12,613,668 B2
(45) Date of Patent: Apr. 28, 2026

(54) HYBRID DISPLAY CONTROL DEVICE AND METHOD

(71) Applicant: KORTEK CORPORATION, Incheon (KR)

(72) Inventors: Kyung Hyun Kim, Incheon (KR); Hak Hyun Kim, Incheon (KR); Hyo Jin Min, Incheon (KR); Bin Ko, Incheon (KR); Jin Young Park, Anyang-si (KR); Woo Hwangbo, Yongin-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/871,578

(22) PCT Filed: Aug. 9, 2022

(86) PCT No.: PCT/KR2022/011826
§ 371 (c)(1),
(2) Date: Dec. 4, 2024

(87) PCT Pub. No.: WO2024/034701
PCT Pub. Date: Feb. 15, 2024

(65) Prior Publication Data
US 2025/0355610 A1     Nov. 20, 2025

(51) Int. Cl.
*G06F 3/14* (2006.01)
*G06F 3/041* (2006.01)

(52) U.S. Cl.
CPC ........ *G06F 3/1423* (2013.01); *G06F 3/04166* (2019.05)

(58) Field of Classification Search
CPC ........................... G06F 3/1423; G06F 3/04166
See application file for complete search history.

(56) References Cited

U.S. PATENT DOCUMENTS 8,482,480 B2 * 7/2013 Kim ...................... G06F 3/1446
345/1.3
8,704,732 B2 * 4/2014 Pourbigharaz ........ G06F 3/1446
345/1.1
(Continued)

FOREIGN PATENT DOCUMENTS

EP          4012549 A1 * 6/2022 ............. G09G 5/373
KR     10-2008-0072368 A     8/2008
(Continued)

OTHER PUBLICATIONS

Machine translation of WO-2017196072-A1 (Year: 2025).*
International Search Report for PCT/KR2022/011826 mailed on May 4, 2023.

*Primary Examiner* — Michael Pervan
(74) *Attorney, Agent, or Firm* — Schmeiser, Olsen & Watts LLP

(57)     ABSTRACT

A hybrid display control device is provided including a hybrid display device in which a first display device formed in a central portion and a second display device formed around the first display device are integrally combined, an image supply and control computer configured to supply an image to the hybrid display device and control each of the display devices according to a preset mode, and a sync control module configured to distribute and provide the image supplied from the image supply and control computer to the first and second display devices, and selectively perform image scaling, timing synchronization, and size synchronization according to a selected mode and characteristics and specifications of each of the display devices.

17 Claims, 13 Drawing Sheets

(56)        References Cited

U.S. PATENT DOCUMENTS

| | | | |
|---|---|---|---|
| 11,531,509 B2 * | 12/2022 | Kim ......................... | G09G 5/34 |
| 11,818,321 B2 * | 11/2023 | Kallio ................... | G06F 3/1423 |
| 2010/0001925 A1 * | 1/2010 | Kim ..................... | G06F 3/1446 |
| | | | 345/1.3 |
| 2012/0075334 A1 * | 3/2012 | Pourbigharaz ........... | G09G 5/12 |
| | | | 345/619 |
| 2021/0224013 A1 * | 7/2021 | Kim ........................ | G06F 3/147 |
| 2022/0321692 A1 * | 10/2022 | Lee ....................... | G06F 1/1643 |
| 2022/0353387 A1 * | 11/2022 | Kallio .................... | G06F 18/22 |

FOREIGN PATENT DOCUMENTS

| | | | | |
|---|---|---|---|---|
| KR | 10-2010-0000116 A | 1/2010 | | |
| KR | 10-2010-0003652 A | 1/2010 | | |
| KR | 101133923 B1 | 4/2012 | | |
| KR | 10-2013-0093634 A | 8/2013 | | |
| KR | 101320504 B1 | 10/2013 | | |
| KR | 10-2017-0127098 A | 11/2017 | | |
| KR | 10-2020-0089951 A | 7/2020 | | |
| KR | 10-2021-0016979 A | 2/2021 | | |
| WO | WO-2017196072 A1 * | 11/2017 | .............. | H04N 5/44 |

* cited by examiner

| | DSP1 | APPLY ANIMATION EFFECT | DSP2 | APPLY SCALING & SYNCHRONIZATION |
|---|---|---|---|---|
| FIRST MODE | FIRST IMAGE | × | FIRST IMAGE | × |
| SECOND MODE | FIRST IMAGE | × | FIRST IMAGE | ○ |
| THIRD MODE | FIRST IMAGE | × | SECOND IMAGE | × |
| FOURTH MODE (EXPANDING MODE) | FIRST IMAGE | ○ | SECOND IMAGE → FIRST IMAGE | ○ |
| FIFTH MODE (EXPANDING MODE) | FIRST IMAGE → SECOND IMAGE | ○ | SECOND IMAGE | ○ |
| SIXTH MODE (SWITCHING MODE) | FIRST IMAGE → SECOND IMAGE | ○ | SECOND IMAGE → FIRST IMAGE | ○ |
| SEVENTH MODE | FIRST TOUCH | × | SECOND TOUCH (AREA) | × |

IMAGE CONTROL MODE

TOUCH CONTROL MODE

HYBRID DISPLAY CONTROL DEVICE AND METHOD

CROSS-REFERENCE TO RELATED APPLICATIONS

This application is a national application of PCT Application No. PCT/KR2022/011826, having a filing date of Aug. 9, 2022, the entire contents of which are hereby incorporated by reference.

FIELD OF TECHNOLOGY

The following relates to a hybrid display control device and method, and more specifically, to a hybrid display control device and method that, when display devices with different characteristics or specifications are combined to manufacture a hybrid display device, the characteristics of the combined display devices are reflected, so that an image without visual heterogeneity may be output and various image effects suitable for gaming displays may be output directly without image editing.

BACKGROUND

Recently, as the technology of video display devices has developed, display devices (or simply described as display panels or displays) with various characteristics and uses have been released.

For example, the display devices include various types such as a liquid crystal display (LCD) device, an organic light emitting diode (OLED) display device, and a light emitting diode (LED) display device.

In the case of gaming display devices, flashy and unique designs are required compared to general display devices, and for this purpose, a hybrid display device that combines a curved LCD panel and an LED display device with fewer shape constraints is required, and the demand for maximizing visual effects through the hybrid display device is increasing.

As described above, a hybrid display device suitable for a gaming display device is composed of an LCD display device with relatively high pixels and a small pixel pitch as a main display device and an LED display device with relatively low pixels and a large pixel pitch disposed around the LCD display device as an auxiliary display device.

However, when attempting to implement a hybrid display device by combining display devices (e.g., LCDs, LEDs, etc.) with different characteristics or specifications (including electrical specifications and physical specifications) as described above, there are difficulties in implementing the hybrid display device due to the following problems.

For example, there is a problem that a separate driving device and separate content are required to drive each of the display devices, there is a problem that visual heterogeneity occurs due to differences in an output timing of an image caused by a difference in a output time compared to an input time of a signal due to differences in a driving method of each of the display devices and characteristics (e.g., pixels) of the display device, and there is also a problem that visual heterogeneity occurs due to differences in the pixel pitch of each of the display devices.

Therefore, there is a demand for a hybrid display device that can output natural and continuous images without visual heterogeneity between display devices with different characteristics or specifications by resolving the above problems.

The background technology of embodiments of the present invention is disclosed in Korean Patent No. 10-1133923 (registered on Mar. 30, 2012, LCD multi-display device combining LEDs using a transparent electrode). The above background technology relates to a display device that can display multiple images by combining an LED transparent glass panel of the same size on a top portion of an LCD panel, and since two display panels with the same size are overlapped and combined vertically to display only a composite image of two images and continuous images between the display panels cannot be displayed, a visual heterogeneity phenomenon due to differences in the characteristics or specifications of the display panels does not occur, and therefore, it does not include a technology for preventing visual heterogeneity.

Another background technology of embodiments of the present invention is disclosed in Korean Patent No. 10-1320504 (registered on Oct. 15, 2013, Mobile terminal). The above background technology relates to a mobile terminal that partitions areas in which a plurality of display modules may be disposed inside a window, and disposes a first display module and a second display module in each partitioned area, and it includes a drag technology for securing continuity of touch between the two display modules, but it does not include a technology for preventing visual heterogeneity by securing continuity of images between the two display modules.

SUMMARY

An aspect relates to a hybrid display control device and method that, when display devices with different characteristics or specifications are combined to manufacture a hybrid display device, the characteristics of the combined display devices are reflected, so that an image without visual heterogeneity may be output and various image effects suitable for gaming displays may be output directly without image editing.

A hybrid display control device according to one aspect of embodiments of the present invention includes a hybrid display device in which a first display device formed in a central portion and a second display device formed around the first display device are integrally combined, an image supply and control computer configured to supply an image to the hybrid display device and control each of the display devices according to a preset mode, and a sync control module configured to distribute and provide the image supplied from the image supply and control computer to the first and second display devices, and selectively perform image scaling, timing synchronization, and size synchronization according to a selected mode and characteristics and specifications of each of the display devices.

According to embodiments of the present invention, the first and second display devices may be display devices with different characteristics and specifications and may have different resolutions and pixel pitches.

According to embodiments of the present invention, the sync control module may include a scaler module configured to select a port through which the image is input from the image supply and control computer, convert and output a resolution and convert a physical layer (PHY) of an input signal, which are suitable for the characteristics of each of the display devices, and adjust a size of the image in accordance with a size of each of the display devices.

According to embodiments of the present invention, the sync control module may include an image synchronization and distribution module configured to perform timing synchronization conforming to the characteristics of the first display device on the image output to the second display device based on an image input to output response time of each of the display devices.

According to embodiments of the present invention, the sync control module may include a processor configured to perform size synchronization conforming to the characteristics of the first display device on the image output to the second display device based on a pixel and pitch ratio between each of the display devices.

According to embodiments of the present invention, the mode may be any one of a plurality of modes that is automatically selected or manually selected by a user according to a preset condition including a game event or a screen touch.

According to embodiments of the present invention, after storing the image in an internal memory module when the image is input, the sync control module may select a first image to be output to the first display device, perform image synchronization for outputting the first image to an active area of the first display device at normal speed, and transmit the synchronized first image in accordance with an image transmission port of the first display device.

According to embodiments of the present invention, the sync control module may select a second image to be output to the second display device from the input image and perform image synchronization for outputting the second image to an active area of the second display device at normal speed, perform at least one of image scaling for adjusting a size of the second image in accordance with a size of the second display device, and timing synchronization and size synchronization for conforming to the characteristics of the first display device on the second image, and transmit the second image in accordance with an image transmission port of the second display device.

According to embodiments of the present invention, when the image is output to the first display device or the second display device, upon selection of any one of a plurality of modes according to a preset condition including a game event or a screen touch, according to the selected mode, the sync control module may selectively apply an animation effect to visually hide a boundary portion between each of the display devices when changing the image output to each of the display devices, or changing and outputting the image to each of the display devices.

According to embodiments of the present invention, in order to obtain an effect that a first image being displayed as a continuous image on the first display device and being continuously and naturally connected to the second display device, the sync control module may apply all of scaling for the image to be output to the second display device and timing synchronization and size synchronization that conform to the characteristics of the first display device without applying an animation effect as a default mode when the first image is output to the first display device and the second display device.

A hybrid display control method according to another aspect of embodiments of the present invention includes supplying, by an image supply and control computer of a hybrid display control device, an image to a hybrid display device and controlling each display device according to a preset mode, and distributing and providing, by a sync control module, the image supplied from the image supply and control computer to first and second display devices of the hybrid display device and selectively performing image scaling, timing synchronization, and size synchronization according to a selected mode and characteristics and specifications of each of the display devices.

According to embodiments of the present invention, the first and second display devices may be display devices with different characteristics and specifications and may have different resolutions and pixel pitches.

According to embodiments of the present invention, in the selective performing of the image scaling, the timing synchronization, and the size synchronization, the sync control module may be configured to, through a scaler module, select a port through which the image is input, convert and output a resolution and convert a physical layer (PHY) of an input signal, which are suitable for the characteristics of each of the display devices, and adjust a size of the image in accordance with a size of each of the display devices, through an image synchronization and distribution module, perform the timing synchronization conforming to the characteristics of the first display device on the image output to the second display device based on an image input to output response time of each of the display devices, and through a processor, perform the size synchronization conforming to the characteristics of the first display device on the image output to the second display device based on a pixel and pitch ratio between each of the display devices.

According to embodiments of the present invention, when the image is supplied from the image supply and control computer, the sync control module may store the image in an internal memory module, select a first image to be output to the first display device, perform image synchronization for outputting the first image to an active area of the first display device at normal speed, and transmit the synchronized first image in accordance with an image transmission port of the first display device.

According to embodiments of the present invention, after storing the image in the internal memory module, the method may further include, by the sync control module, selecting a second image to be output to the second display device from the input image, performing image synchronization for outputting the second image to an active area of the second display device at normal speed, performing at least one of image scaling for adjusting a size of the second image in accordance with a size of the second display device, and timing synchronization and size synchronization for conforming to the characteristics of the first display device for on second image, and then transmitting the second image in accordance with an image transmission port of the second display device.

According to embodiments of the present invention, when the image is output to the first display device or the second display device, upon selection of any one of a plurality of modes according to a preset condition including a game event or a screen touch, the method may further include according to the selected mode, selectively applying, by the sync control module, an animation effect to visually hide a boundary portion between each of the display devices when changing the image output to each of the display devices, or changing and outputting the image to each of the display devices.

According to embodiments of the present invention, when distributing and providing the image supplied from the image supply and control computer to the first and second display devices of the hybrid display device, in order to obtain an effect that a first image being displayed as a continuous image on the first display device and being continuously and naturally connected to the second display device, the sync control module may apply all of scaling for the image to be output to the second display device and timing synchronization and size synchronization that conform to the characteristics of the first display device without applying an animation effect as a default mode when the first image is output to the first display device and the second display device.

According to one aspect of embodiments of the present invention, when a hybrid display device is manufactured by combining display devices with different characteristics or specifications, since embodiments of the present invention reflects the characteristics of the combined display devices, it is possible to output an image without visual heterogeneity or to output various image effects suitable for a gaming display directly without image editing.

The hybrid display device of embodiments of the present invention is configured so that a first display panel portion and a second display panel portion that are different types of display panel portions are disposed to partially overlap each other, and the second display panel portion covers a non-display area of the first display panel portion. Therefore, the screen on which an image is displayed can be enlarged, and the image can be displayed without any areas of image discontinuity between the first display panel portion and the second display panel portion.

According to the hybrid display device of embodiments of the present invention, since a large screen is implemented by disposing a plurality of inexpensive display panel portions to be adjacent to each other, manufacturing costs can be reduced compared to a display device equipped with a single display panel having a large screen.

According to embodiments of the present invention, since a first display panel portion that has high resolution but is difficult to form in a curved manner and a second display panel portion that has low resolution but is easy to form in a curved manner, it is possible to easily manufacture a display device that is bendable and has high-cost effectiveness.

BRIEF DESCRIPTION

Some of the embodiments will be described in detail, with references to the following Figures, wherein like designations denote like members, wherein:

FIG. 6 shows a perspective view of a hybrid display device according to a second embodiment of the present invention;

FIG. 12 shows an exemplary diagram showing, in a table form, a method for applying image output and animation effects to the hybrid display device (H-DSP) according to each mode in FIG. 11;

Figure 13A:
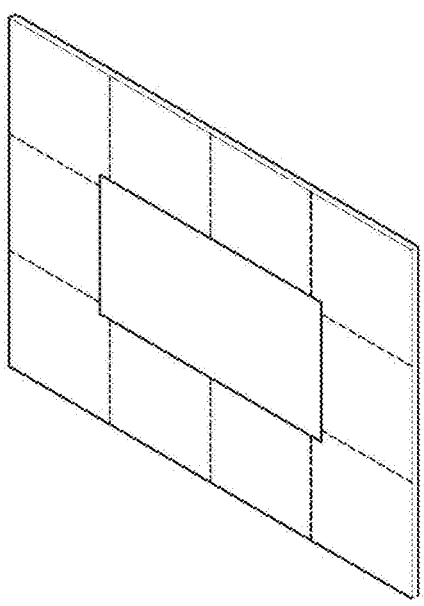
Figure 13B:
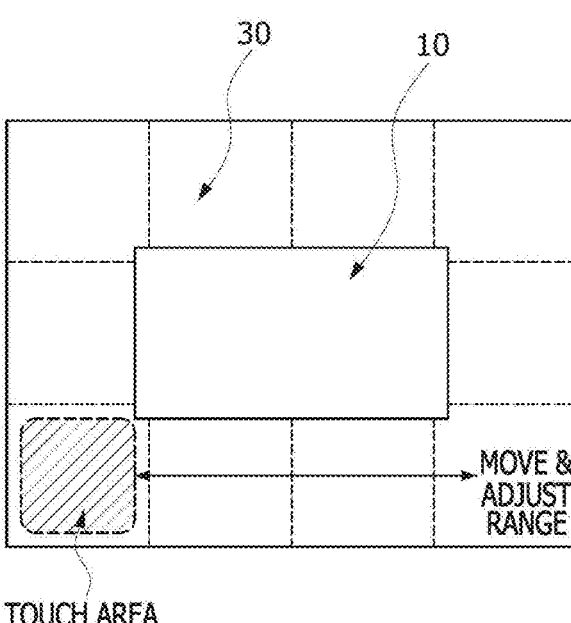

FIG. 13A shows an exemplary diagram for describing an operation of a seventh mode of moving a touchable area or adjusting a range thereof in a touchable display device or the corresponding display device in FIG. 12; and FIG. 13B shows an exemplary diagram for describing an operation of a seventh mode of moving a touchable area or adjusting a range thereof in a touchable display device or the corresponding display device in FIG. 12.

DETAILED DESCRIPTION

Hereinafter, one embodiment of a hybrid display control device and method according to the present invention will be described with reference to the accompanying drawings.

In this process, thicknesses of lines, sizes of components, or the like that are illustrated in the drawings may be exaggerated for clarity and convenience of description. In addition, the terms described below are terms defined in consideration of functions in embodiments of the present invention and may vary according to the intention or the custom of the user or operator. Therefore, the definition of these terms should be made based on the contents throughout the present specification.

Figure 1:
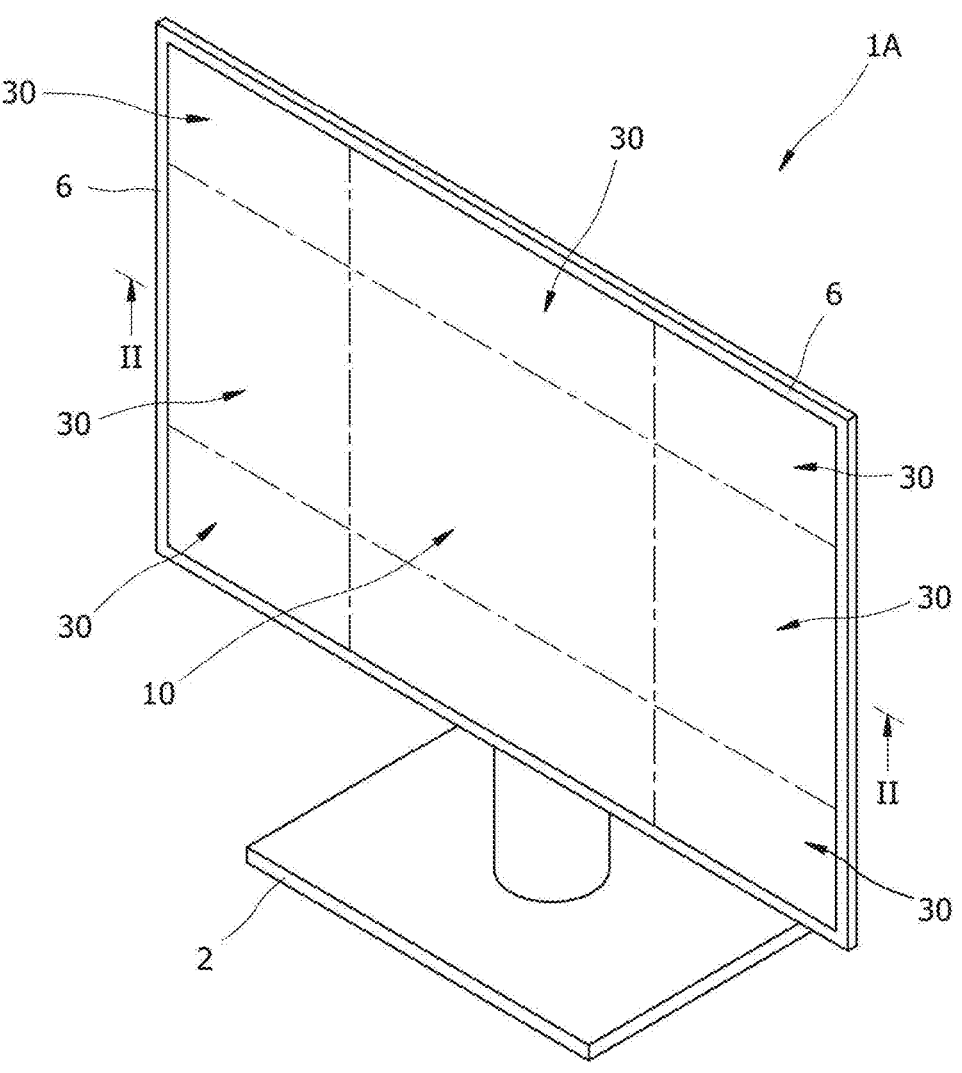
FIG. 1 shows a perspective view of a hybrid display device according to a first embodiment of the present invention.
Figure 2:
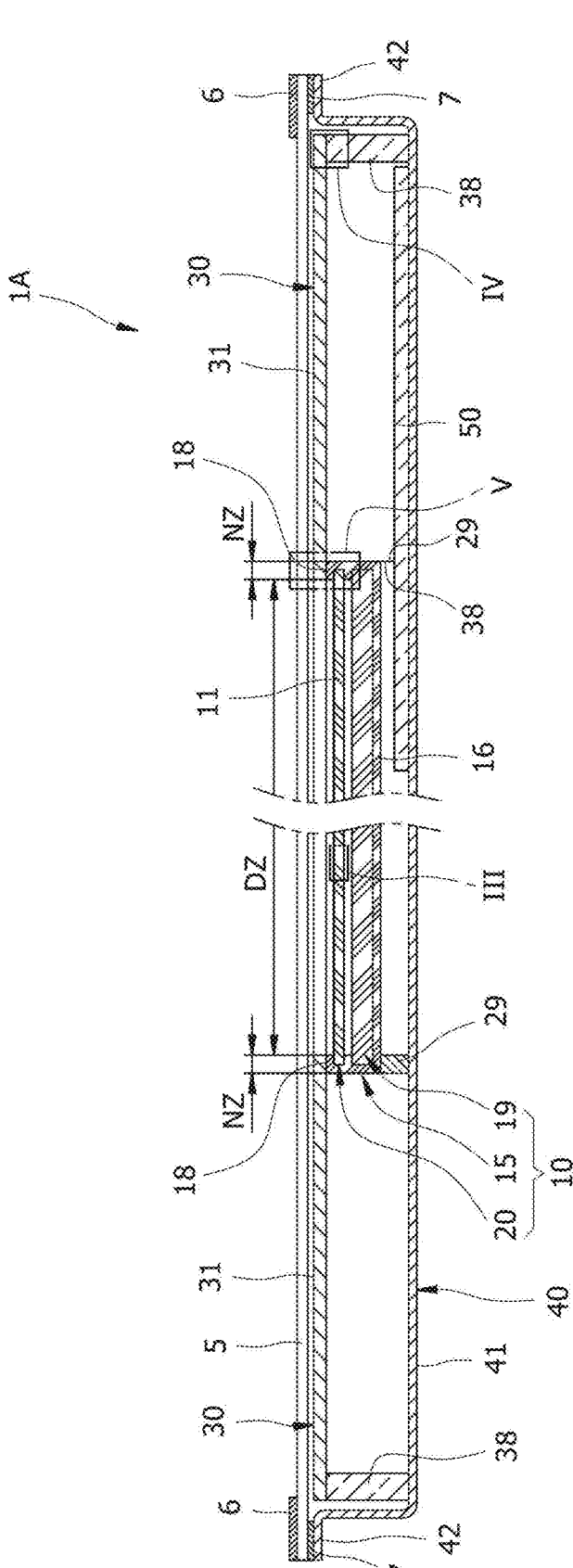
FIG. 2 shows a cross-sectional view taken along line II-II of FIG. 1.
Figure 3:
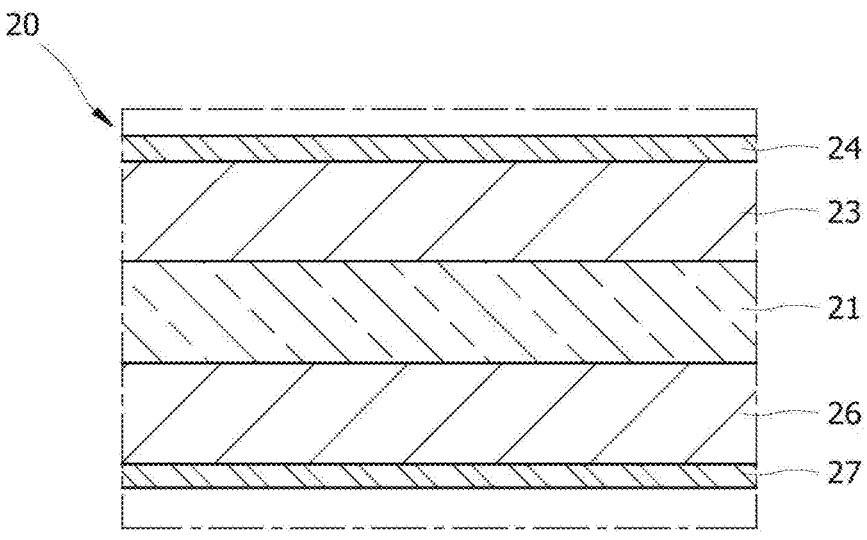
FIG. 3 shows an enlarged view of portion III of FIG. 2.
Figure 4:
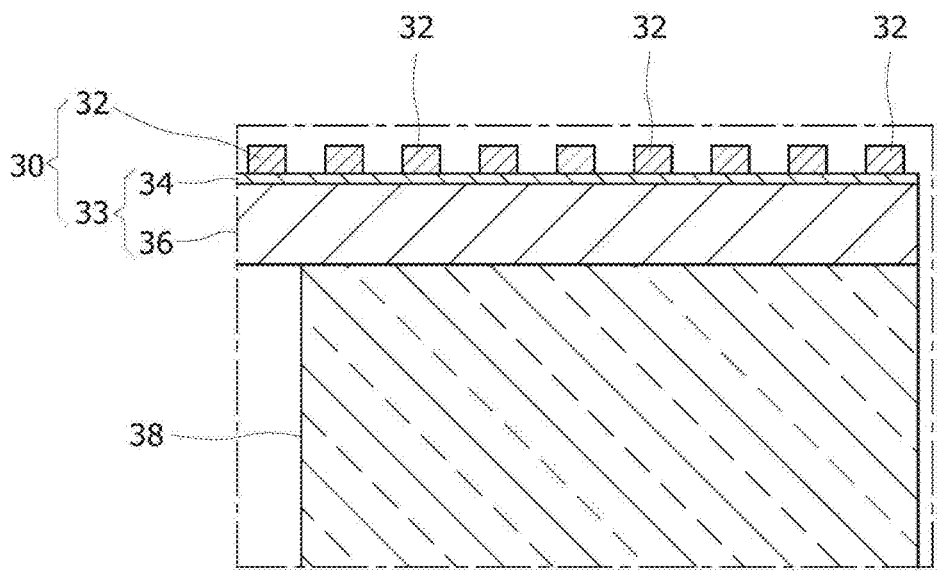
FIG. 4 shows an enlarged view of portion IV of FIG. 2.
Figure 5:
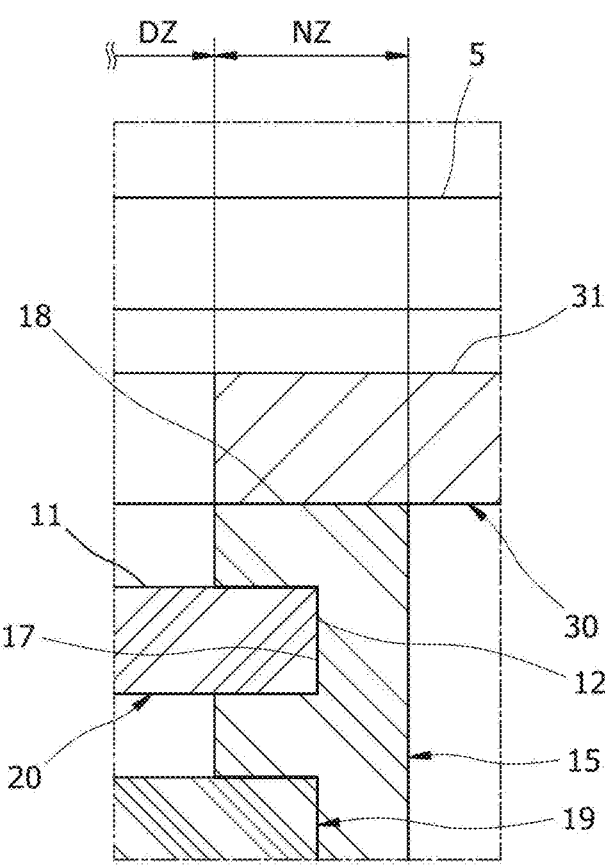
FIG. 5 shows an enlarged view of portion V of FIG. 2.

FIG. 1 is a perspective view of a hybrid display device according to a first embodiment of the present invention, FIG. 2 is a cross-sectional view taken along line II-II of FIG. 1, FIG. 3 is an enlarged view of portion III of FIG. 2, FIG. 4 is an enlarged view of portion IV of FIG. 2, and FIG. 5 is an enlarged view of portion V of FIG. 2. Referring to FIGS. 1 to 5, a hybrid display device 1A according to the first embodiment of the present invention is a monitor or a TV receiver, and includes a rear cover 40, a support leg 2, a transparent protective panel 5, a first display panel portion 10, a second display panel portion 30, and a main circuit board 50.

The rear cover 40 is a member that has a space formed therein to accommodate the first display panel portion 10 and the second display panel portion 30 and has an open front surface. The rear cover 40 is provided with a rear plate portion 41 having a substantially quadrangular shape and a flange portion 42 extending outward from a front-end edge. The support leg 2 is fixedly coupled to the rear cover 40 so that the rear cover 40 stands up on a flat floor surface.

The transparent protective panel 5 is disposed in front of the first display panel portion 10 and the second display panel portion 30 to protect a front surface 11 of the first display panel portion 10 and a front surface 31 of the second display panel portion 30 that are accommodated inside the rear cover 40 and closes the open front surface of the rear cover 40. An outer edge portion of the transparent protective panel 5 is fixedly coupled to the flange portion 42 via a double-sided adhesive tape 7. The transparent protective panel 5 is provided with a bezel layer 6 formed by printing and curing an opaque-colored paint, so that the flange portion 42 and the adhesive tape 7 are not exposed at the outer edge portion.

The transparent protective panel 5 may be a transparent tempered glass plate. The transparent protective panel 5 may further include a touch sensing unit (not shown) on a rear surface thereof. The transparent protective panel with the touch sensing unit may be referred to as a touch screen panel (TSP) glass. The touch sensing unit may be in the form of a flexible film capable of being bent or a hard panel incapable of being bent.

The first display panel portion 10 and the second display panel portion 30 are respectively provided with the front surfaces 11 and 31 on which an image is displayed. The hybrid display device 1A shown in FIG. 1 is provided with one first display panel portion 10 at a central portion of a screen and provided with a plurality of second display panel portions 30 consecutively disposed around the first display panel portion 10 to surround the outer periphery of the first display panel portion 10.

The first display panel portion 10 is provided with a display area DZ in which an image is displayed at a central portion of the front surface 11, and a non-display area NZ in which the image is not displayed at an outer peripheral portion of a front surface adjacent to the display area DZ. The first display panel portion 10 is provided with a backlight unit BLU 19, a liquid crystal panel 20, and a panel holder 15. In detail, the first display panel portion 10 may be a so-called LCD panel. The backlight unit 19 projects white light forward. The liquid crystal panel 20 is disposed in front of the backlight unit 19 and selectively transmits the white light projected from the backlight unit 19.

The liquid crystal panel 20 includes a front substrate 23 and a rear substrate 26 that are parallel to each other and transparent, a liquid crystal layer 21, a front polarizing film 24, and a rear polarizing film 27. The liquid crystal layer 21 is interposed between the front substrate 23 and the rear substrate 26. On a rear surface of the front substrate 23 and a front surface of the rear substrate 26 that face each other with the liquid crystal layer 21 interposed therebetween, a transparent electrode (not shown) is formed so that an electrical signal is applied to each pixel. When the electrical signal is applied to a specific pixel through the transparent electrode, a twisted liquid crystal is untwisted or conversely, the liquid crystal is twisted depending on the type of liquid crystal.

The front polarizing film 24 is attached to the front surface of the front substrate 23, and the rear polarizing film 27 is attached to the rear surface of the rear substrate 26. The front substrate 23 to which the front polarizing film 24 is attached may be referred to as a front polarizing panel, and the rear substrate 26 to which the rear polarizing film 27 is attached may be referred to as a rear polarizing panel.

The backlight unit 19 may include a light guide plate (not shown) having a planar shape corresponding to a planar shape of the liquid crystal panel 20 and a backlight light source (not shown) radiating white light to a side surface of the light guide plate. Alternatively, the backlight unit 19 may include a light diffusion plate (not shown) having a planar shape corresponding to the planar shape of the liquid crystal panel 20 and a backlight light source (not shown) projecting light from the rear of the light diffusion plate to a rear surface of the light diffusion plate. The backlight light source may be provided with a plurality of light emitting diode (LED) packages.

The panel holder 15 is a quadrangular window frame-shaped member that supports the liquid crystal panel 20 and the backlight unit 19. The panel holder 15 is provided with a rear plate portion 16 that supports the backlight unit 19 by contact and a fitting groove portion 17 at the front-end portion into which an outer peripheral portion 12 of the liquid crystal panel 20 is fitted. The non-display area NZ of the first display panel portion 10 includes a front surface 18 of a front-end portion of the panel holder 15 in which the fitting groove portion 17 is formed. In other words, a portion covered by the front surface 18 of the panel holder 15 occupies all or at least a portion of the non-display area NZ.

The second display panel portion 30 is a display panel in which the image is displayed over the entire area of the front surface 31 and is a different type of display panel from the first display panel portion 10. Each second display panel portion 30 partially overlaps the first display panel portion 10 and is disposed adjacent to the first display panel portion 10 so that the display area DZ of the first display panel portion 10 is exposed forward and the non-display area NZ is covered. In detail, the second display panel portion 30 is disposed so that a portion of an outer edge portion of the second display panel portion 30 covers the non-display area NZ of the first display panel portion 10.

Each second display panel portion 30 is provided with a plurality of LED packages 32 arranged in a matrix corresponding to a plurality of pixels, and an LED board 33 supporting the plurality of LED packages 32. In detail, the second display panel portion 30 may be a so-called LED module. Each LED package 32 is configured to package a plurality of LEDs that emit light with different colors into one, and package one LED R that emits red light, one LED G that emits green light, and one LED B that emits blue light into one to emit all natural colors.

The LED board 33 is provided with a flexible printed circuit board (FPCB) 34 that is electrically connected to the plurality of LED packages 32 so that the plurality of LED packages 32 may emit light, and a flexible support plate 36 that supports the plurality of LED packages 32 and the FPCB 34. Each of the FPCB 34 and the flexible support plate 36 may be bent. Therefore, the second display panel portion 30 may easily implement not only a display device having a flat screen, but also a display device having a curved screen. The flexible support plate 36 may be made of a rubber material.

Although not shown in the drawings, the second display panel portion 30 may further include a light diffusion plate to diffuse light from the LED packages 32 so that a so-called hot spot phenomenon does not occur. Meanwhile, the LED board 33 is not limited to being able to be bent by having the FPCB 34 and the flexible support plate 36 and may be a rigid LED board that is not easily bent by having, for example, a PCB or a metal support plate.

The main circuit board 50 may be fixedly supported on the rear plate portion 41 of the rear cover 40. A control circuit is formed on the main circuit board 50 to control the first display panel portion 10 and the second display panel portion 30 so that an image corresponding to a received image data is displayed on the front surfaces 11 and 31 of the first display panel portion 10 and the second display panel portion 30 by receiving the image data.

The rear plate portion 41 of the rear cover 40 is provided behind the first display panel portion 10 and the second display panel portion 30. The hybrid display device 1A further includes a first spacer 29 interposed between the first display panel portion 10 and the rear plate portion 41 so that the first display panel portion 10 is spaced apart from the rear plate portion 41, and a second spacer 38 interposed between the second display panel portion 30 and the rear plate portion 41 so that the second display panel portion 30 is spaced apart from the rear plate portion 41.

A front end of the first spacer 29 may be attached to a rear surface of the panel holder 15, and a rear end of the first spacer 29 may be attached to the rear plate portion 41 of the rear cover 40. The first spacer 29 may include a plurality of spacer pieces. The plurality of spacer pieces of the first spacer 29 may be disposed along a closed curve path overlapping the outer edge of the rear surface of the panel holder 15, like forming a fence.

A front end of the second spacer 38 may be attached to the rear surface of the second display panel portion 30, and a rear end of the second spacer 38 may be attached to the rear plate portion 41 of the rear cover 40. The second spacer 38 may include a plurality of spacer pieces. The plurality of spacer pieces of the second spacer 38 may be disposed along a closed curve path overlapping the outer edge of the rear surface of the second display panel portion 30, like forming a fence.

The second spacer 38 is disposed to avoid one side portion of the second display panel portion 30 that overlaps the non-display area NZ of the first display panel portion 10. In other words, the second spacer 38 is not disposed at the rear of one side outer peripheral portion of the second display panel portion 30 overlapping the non-display area NZ of the outer peripheral portion of the second display panel portion 30. When the second spacer 38 is disposed at the rear of the one side outer portion of the second display panel portion 30, a stepped gap between the front surface 31 of the second display panel portion 30 and the front surface 11 of the first display panel portion 10 becomes too large, and thus a viewer of the hybrid display device 1A may feel a great sense of heterogeneity when watching an image, and the image may appear to be disconnected at a boundary portion between the first display panel portion 10 and the second display panel portion 30.

Meanwhile, the main circuit board 50 may be disposed to overlap at least one of the first display panel portion 10 and the second display panel portion 30. In this case, the first spacer 29 or the second spacer 38 is disposed to avoid the main circuit board 50.

Figure 6:
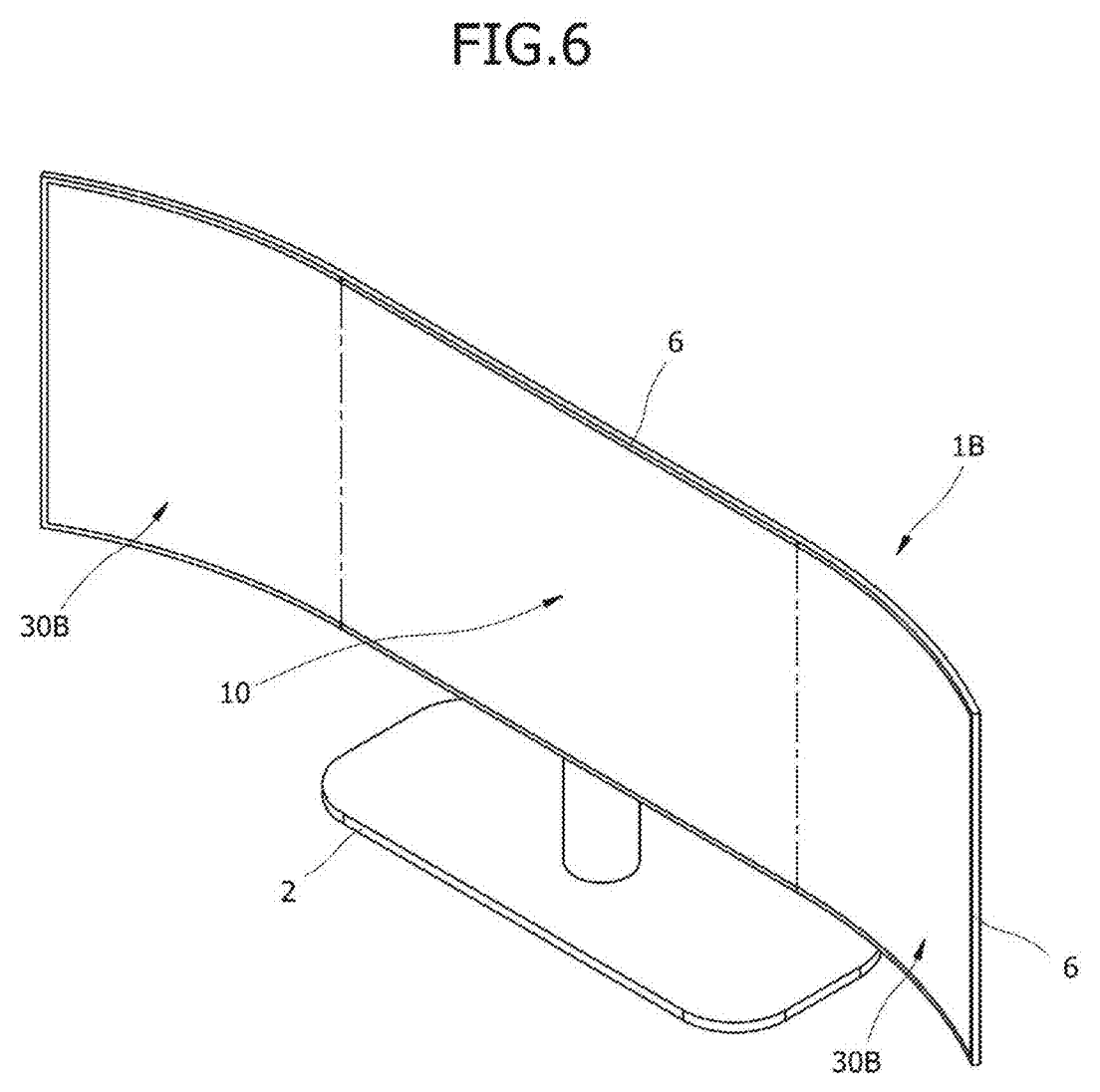

FIG. 6 is a perspective view of a hybrid display device according to a second embodiment of the present invention. Referring to FIG. 6, a hybrid display device 1B according to the second embodiment of the present invention, like the hybrid display device 1A according to the first embodiment of the present invention, is provided with a first display panel portion 10, a second display panel portion 30B, a transparent protective panel (not shown), a rear cover (not shown), and a support leg 2. The transparent protective panel, the rear cover, and the support leg 2 were already mentioned in the description of the hybrid display device 1A according to the first embodiment of the present invention, so redundant descriptions thereof will be omitted. Reference number '6' denotes a bezel layer that was already mentioned in the hybrid display device 1A according to the first embodiment of the present invention, so redundant description thereof will be omitted.

Internal configurations and functions of the first display panel portion 10 and the second display panel portion 30B are the same as those of the first display panel portion 10 and the second display panel portion 30 of the hybrid display device 1A according to the first embodiment of the present invention, so redundant descriptions thereof will be omitted.

The hybrid display device 1B shown in FIG. 6 is provided with the first display panel portion 10 that is flat and a pair of curved second display panel portions 30B that are disposed at left and right sides of the first display panel portion 10. Since the second display panel portion 30B is provided with a bendable LED board 33 (see FIG. 4), it may be easily manufactured in a curved shape. With this configuration, a screen of the hybrid display device 1B is curved at the left and right sides to form an overall curved surface shape.

Figure 7:
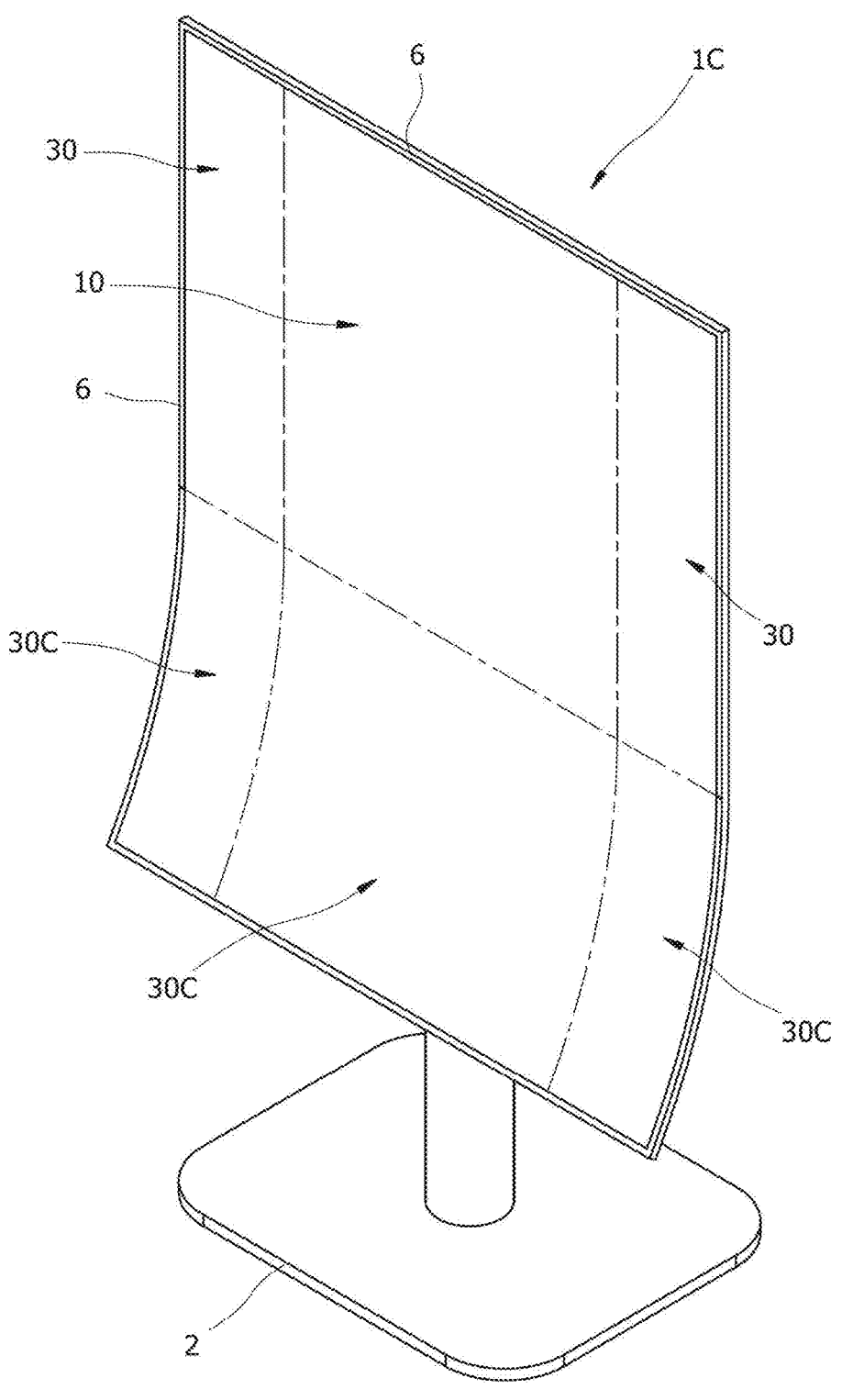
FIG. 7 shows a perspective view of a hybrid display device according to a third embodiment of the present invention.

FIG. 7 is a perspective view of a hybrid display device according to a third embodiment of the present invention.

Referring to FIG. 7, a hybrid display device 1C according to the third embodiment of the present invention, like the hybrid display device 1A according to the first embodiment of the present invention, is provided with a first display panel portion 10, second display panel portions 30 and 30C, a transparent protective panel (not shown), a rear cover (not shown), and a support leg 2. The transparent protective panel, the rear cover, and the support leg 2 were already mentioned in the description of the hybrid display device 1A according to the first embodiment of the present invention, so redundant descriptions thereof will be omitted. Reference number '6' denotes a bezel layer that was already mentioned in the hybrid display device 1A according to the first embodiment of the present invention, so redundant description thereof will be omitted.

Internal configurations and functions of the first display panel portion 10 and the second display panel portions 30 and 30C are the same as those of the first display panel portion 10 and the second display panel portion 30 of the hybrid display device 1A according to the first embodiment of the present invention, so redundant descriptions thereof will be omitted.

The hybrid display device 1C shown in FIG. 7 is provided with the first display panel portion 10 that is flat, a pair of flat second display panel portions 30 that are disposed at the left and right sides of the first display panel portion 10, and three curved second display panel portions 30C disposed under the first display panel portion 10 and the pair of flat second display panel portions 30. Since each second display panel portion 30C is provided with a bendable LED board 33 (see FIG. 4), it may be easily manufactured in a curved shape. With this configuration, a screen of the hybrid display device 1C becomes a curved surface shape with a lower side bent.

The above-described hybrid display devices 1A, 1B, and 1C are configured such that the first display panel portion 10 and the second display panel portions 30, 30B, and 30C, which are different types of display panel portions, are disposed to partially overlap each other, and the second display panel portions 30, 30B, and 30C cover the non-display area NZ of the first display panel portion 10. Therefore, the screen on which the image is displayed may be enlarged, and the image may be displayed, which is naturally continuous without any areas of image discontinuity between the first display panel portion 10 and the second display panel portions 30, 30B, and 30C.

Since the hybrid display devices 1A, 1B, and 1C implement a large screen by arranging a plurality of inexpensive display panel portions 10, 30, 30B, and 30C adjacent to each other, manufacturing costs can be reduced compared to a display device provided with a single display panel having a large screen.

In addition, since the first display panel portion 10 that has high resolution but is difficult to form in a curved manner and the second display panel portions 30B and 30C that have low resolution but are easy to form in a curved manner are combined, it is possible to easily manufacture a display device that is bendable and has high-cost effectiveness.

Figure 8:
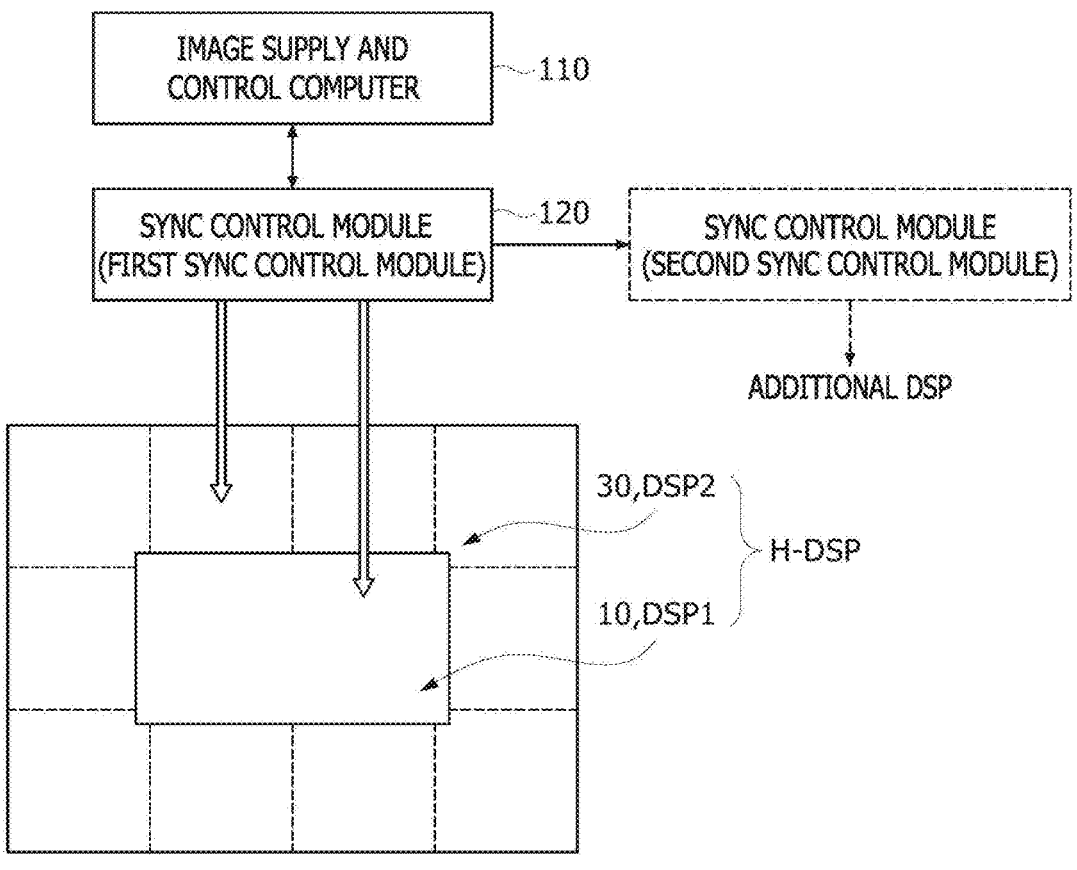
FIG. 8 shows an exemplary diagram showing a schematic configuration of a hybrid display control device according to one embodiment of the present invention.

FIG. 8 is an exemplary diagram showing a schematic configuration of a hybrid display control device according to an embodiment of the present invention.

As shown in FIG. 8, the hybrid display control device according to the present embodiment includes an image supply and control computer 110, a sync control module 120, and a hybrid display device H-DSP.

As previously described, the hybrid display device H-DSP is manufactured by combining a first display device 10 (or may be referred to as DSP1) and a second display device 30 (or may be referred to as DSP2), and it should be noted that the first and second display devices 10 and 30 are display devices having different characteristics and specifications.

For example, it is assumed that the first display device 10 is a 27″ LCD display device with a pitch of 0.3114 mm and a resolution of 1920×1080, and the second display device 30 formed around the first display device 10 is an LED display device composed of 10 LED modules (640×480) with a pitch of 1.8 mm and a resolution of 160×160.

The image supply and control computer 110 supplies an image (or content) to the hybrid display device H-DSP and controls each of the display devices 10 and 30 according to a preset mode.

In this case, the image (or content) is physically one image, but may be two images (i.e., a first image and a second image) from a software perspective. For example, the image (or content) may be an image generated by dividing an internal area of the image into two areas in accordance with a layout of the first and second display devices combined in the hybrid display device. Alternatively, the image (or content) may be sequentially transmitted as two physically separated images.

Here, the mode may be any one of a plurality of modes that is automatically (or by default) selected according to a preset condition (e.g., a game event, a screen touch, etc.), or is manually selected by a user (see FIG. 12).

The sync control module 120 distributes and provides the image supplied (provided) from the image supply and control computer 110 to the first display device 10 and the second display device 30, and may perform image scaling, timing synchronization, and size synchronization according to the selected mode and the characteristics and specifications of each of the display devices 10 and 30.

In this case, the sync control module 120 (a first sync control module) may further include an additional sync control module (a second sync control module) controlled in a cascade manner when there is an additional display device.

Figure 9:
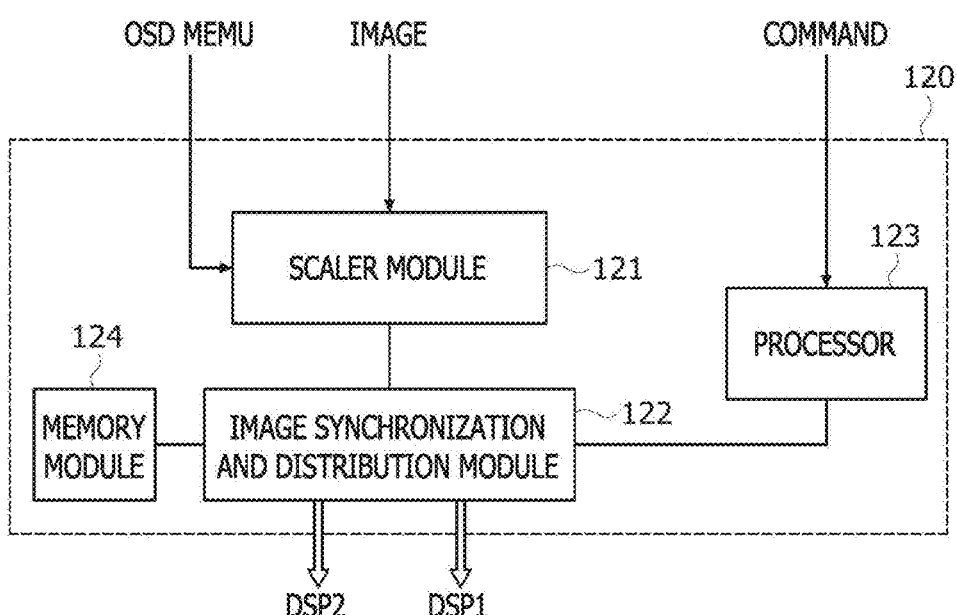
FIG. 9 shows an exemplary diagram showing a more specific configuration of a sync control module in FIG. 8.

FIG. 9 is an exemplary diagram showing a more specific configuration of the sync control module in FIG. 8.

As shown in FIG. 9, the sync control module 120 includes a scaler module 121, an image synchronization and distribution module 122, a processor 123, and a memory module 124.

The scaler module 121 performs functions such as selecting a port (e.g., DP, HDMI, etc.) through which the image is input from the image supply and control computer 110, converting and outputting various resolutions and converting a physical layer (PHY) of an input signal, which are suitable for the characteristics of each of the display devices 10 and 30.

In addition, the scaler module 121 may synthesize an on screen display (OSD) based on commands input via the image supply and control computer 110 or a separate OSD menu button (not shown) and provide the synthesized OSD to each of the display devices 10 and 30. In addition, the scaler module 121 may adjust a size of the image (image scaling) in accordance with sizes of the first and second display devices 10 and 30.

The image synchronization and distribution module 122 may perform a timing synchronization (Timing Sync) function according to the characteristics of each of the display devices 10 and 30, that is, a timing synchronization (Timing Sync) conforming to the first display device 10 based on an image input to output response time of each of the display devices 10 and 30 using information stored in the memory module 124. The image synchronization and distribution module 122 performs a transmission function of the physical layer (PHY) suitable for each of the display devices 10 and 30.

The processor 123 processes a user interface (UI) and a customized image scaling function applying an image scaling coefficient to perform a size synchronization (Size Sync) function according to the characteristics of each of the display devices 10 and 30. That is, the processor 123 may perform size synchronization conforming to the first display device based on a pixel and pitch ratio between each of the display devices 10 and 30.

In addition, the processor 123 may receive a command (e.g., an operation command input via a UI, etc.) through a designated communication port (e.g., USB, etc.).

In addition, the processor 123 may receive information about an active area position for outputting an image to each of the display devices 10 and 30 via the user interface (UI) or use information about an active area position stored in advance in the memory module 124 to output the image to an active area Meanwhile, as described above, the image (content) supplied to the hybrid display device H-DSP may be produced in various ways.

For example, considering the display area of each of the display devices 10 and 30 within the entire screen of a gaming image (content), the image (content) to be output to the two display devices 10 and 30 may be integrally produced within one image (content), or the image (content) to be output to each of the display devices 10 and 30 may be separately produced.

That is, a gaming driving image may be output to the first display device 10, and a decoration image may be output to the second display device 30.

For example, when an event such as a jackpot occurs, since the image may be output by being continuously connected as if the first and second display devices 10 and 30 were one display device, or a flashy large-screen event image such as fireworks or coins may be provided as a decoration image, it is possible to improve user satisfaction.

First Embodiment

Figure 10:
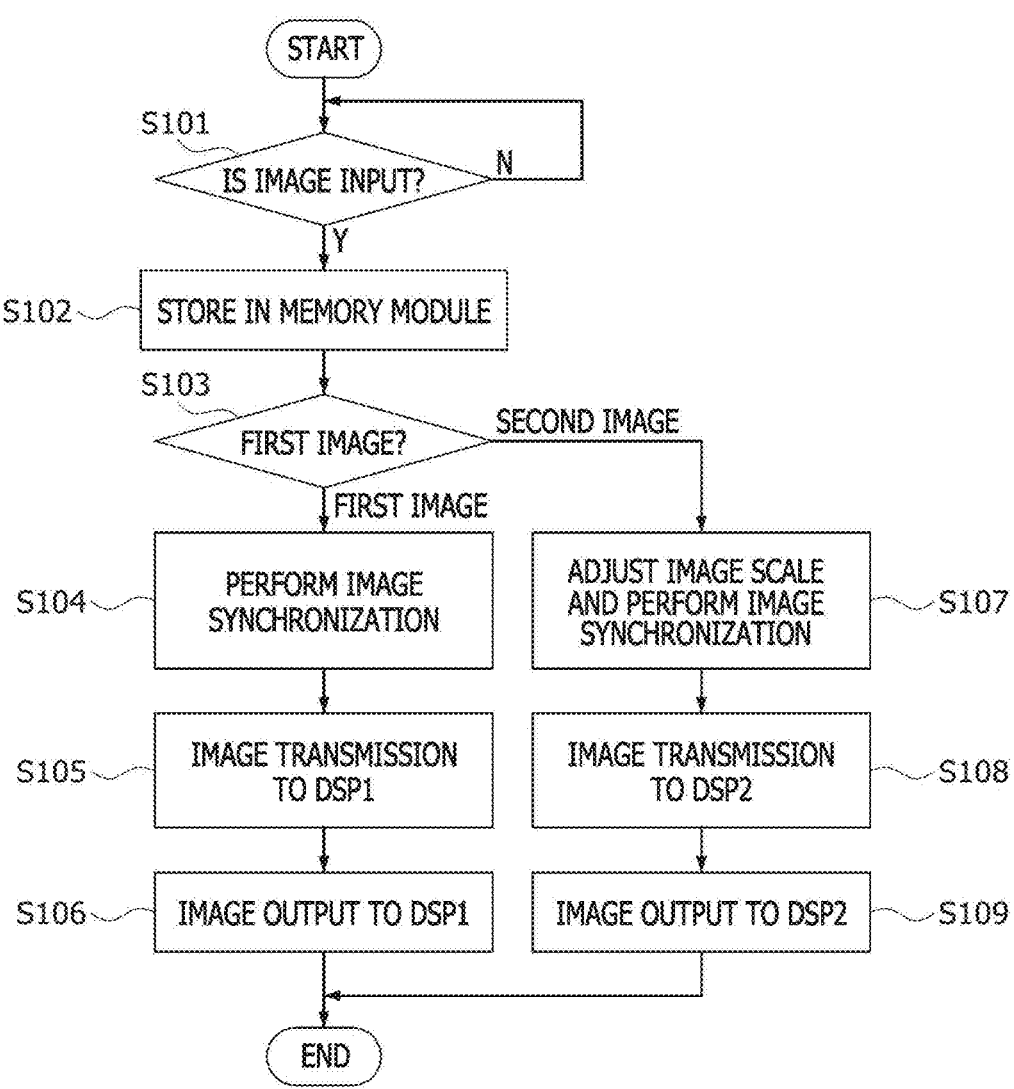
FIG. 10 shows a flowchart for describing a hybrid display control method according to the first embodiment of the present invention.

FIG. 10 is a flowchart for describing a hybrid display control method according to the first embodiment of the present invention.

Referring to FIG. 10, when an image is input from the image supply and control computer 110 (Yes in S101), the sync control module 120 stores the input image in an internal memory module (S102) and selects (extracts) a first image to be output to the first display device 10 from the input image (S103).

In addition, the sync control module 120 performs image synchronization (i.e., processing for outputting the first image to the active area at a normal speed according to the characteristics of the first display device) on the selected first image in accordance with the characteristics of the first display device 10 (S104).

In addition, the sync control module 120 transmits the synchronized image (i.e., the first image) (S105) to output the synchronized image to the first display device 10 (DSP1) (S106) according to the characteristics of an image transmission port (e.g., PD, HDMI, etc.) of the first display device 10 (DSP1).

Meanwhile, after selecting (extracting) a second image to be output to the second display device 30 from the input image (S103), the sync control module 120 performs image synchronization (i.e., processing for outputting the second image to the active area at a normal speed according to the characteristics of the second display device) on the selected second image in accordance with the characteristics of the second display device 30, and performs image scaling (adjusting a size of the image in accordance with a size of the second display device), and timing synchronization (Timing Sync) and size synchronization (Size Sync) that conform to the characteristics of the first display device according to a preset default mode (e.g., a second mode in FIG. 12) (S107).

In addition, the sync control module 120 transmits the synchronized image (i.e., the second image) (S108) to output the synchronized image to the second display device 30 (DSP2) (S109) according to the characteristics of an image transmission port (e.g., PD, HDMI, etc.) of the second display device 30 (DSP2).

Hereafter, a method of outputting an image to the first and second display devices 10 and 30 according to modes will be described.

Second Embodiment

Figure 11:
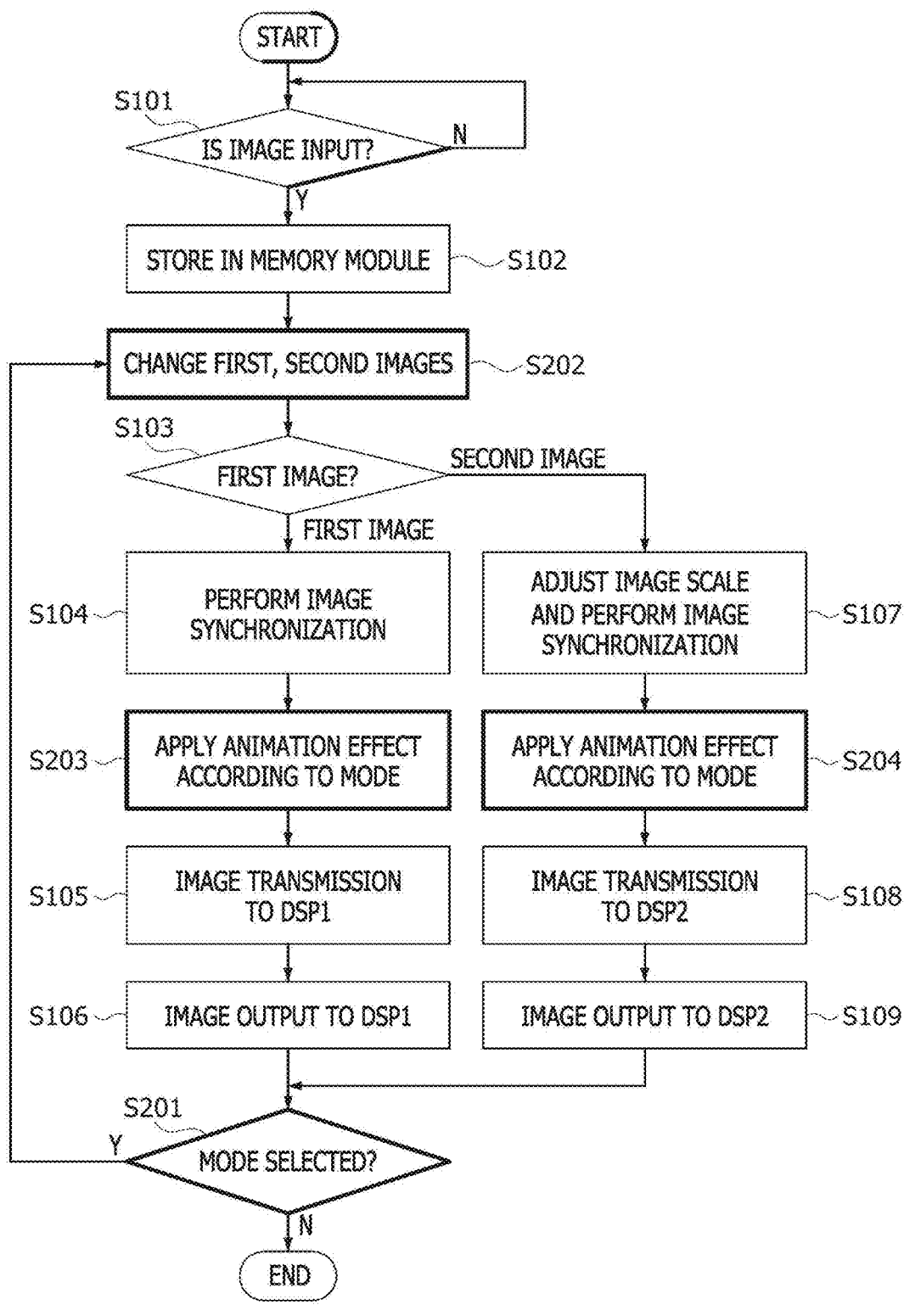
FIG. 11 shows a flowchart for describing a hybrid display control method according to the second embodiment of the present invention.

FIG. 11 is a flowchart for describing a hybrid display control method according to the second embodiment of the present invention, and the basic operations (S101 to S109) for receiving the image from the image supply and control computer 110 and outputting the image to each of the display devices 10 and 30 are the same as those of the method shown in FIG. 10.

However, in the present embodiment, when any one of a plurality of modes is automatically (or by default) selected, or manually selected by the user (Yes in S201) as shown in FIG. 12 according to a preset condition (e.g., a game event, a screen touch, etc.) while the image is output to each of the display devices 10 and 30, the image output (i.e., the first and second images) to each of the display devices may be changed (S202) according to the selected mode, and in addition, when outputting the image corresponding to each of the display devices in the corresponding mode, an animation effect (e.g., an animation effect for visually hiding a boundary portion of each of the display devices when changing and outputting the image to each of the display devices) may be applied (S203 and S204).

FIG. 12 is an exemplary diagram showing, in a table form, a method for applying image output and an animation effect to the hybrid display device (H-DSP) according to each mode in FIG. 11.

Referring to FIG. 12, in the case of a first mode in which an animation effect is not applied when outputting the first image (i.e., one continuous image) to the first display device 10 (DSP1) and the second display device 30 (DSP2), and also the scaling (i.e., adjusting the size of the image in accordance with the size of the second display device) for the image to be output to the second display device 30 or the timing synchronization (Timing Sync) and size synchronization (Size Sync) that conform to the characteristics of the first display device are not applied, there is an effect in which a special effect is automatically produced as if a different image is output to each of the display devices 10 and 30 directly without image editing.

In addition, in the case of a second mode (default mode) in which the animation effect is not applied when outputting the first image (i.e., one continuous image) to the first display device 10 (DSP1) and the second display device 30 (DSP2), and all of the scaling (i.e., adjusting the size of the image in accordance with the size of the second display device) for the image to be output to the second display device 30, and the timing synchronization (Timing Sync) and size synchronization (Size Sync) that conform to the characteristics of the first display device are applied, there is an effect (i.e., an effect in which one image is displayed on one large-screen display device) in which the image displayed on the first display device 10 is continuously and naturally connected and displayed on the second display device 20.

In addition, in the case of a third mode in which the animation effect is not applied when outputting the first image and the second image (e.g., images that are physically one image but have different contents) to the first display device 10 (DSP1) and the second display device 30 (DSP2) respectively, and also the scaling (i.e., adjusting the size of the image in accordance with the size of the second display device) for the image to be output to the second display device 30 or the timing synchronization (Timing Sync) and size synchronization (Size Sync) that conform to the characteristics of the first display device are not applied, there is an effect in which a different image effect (i.e., an image effect in which different special effects are applied and edited) from the image displayed on the first display device 10 is applied and output to the second display device 30 without image editing.

In addition, in the case of a fourth mode in which the animation effect is applied when the first image that has been output to the first display device 10 is to be continuously output instead of the second image that has been output to the second display device 30 while the first image and the second image (e.g., images that are physically one image but have different contents) are output to the first display device 10 (DSP1) and the second display device 30 (DSP2) respectively, and also the scaling (i.e., adjusting the size of the image in accordance with the size of the second display device) for the image to be output to the second display device 30, and the timing synchronization (Timing Sync) and size synchronization (Size Sync) that conform to the characteristics of the first display device are applied, there is an effect in which an expanding effect is applied and output as if the display area of the first display device 10 is expanded to the second display device 30 without image editing.

In addition, in the case of a fifth mode in which the animation effect is applied when the second image that has been output to the second display device 30 is to be continuously output instead of the first image that has been output to the first display device 10 while the first image and the second image (e.g., images that are physically one image but have different contents) are output to the first display device 10 (DSP1) and the second display device 30 (DSP2) respectively, and also the scaling (i.e., adjusting the size of the image in accordance with the size of the first display device) for the image to be output to the first display device 10, and the timing synchronization (Timing Sync) and size synchronization (Size Sync) that conform to the characteristics of the first display device are applied, there is an effect in which a contracting effect is applied as if the display area of the second display device 30 is contracted to the first display device 10 without image editing.

In addition, in the case of a sixth mode in which the animation effect is applied when the first image that has been output to the first display device 10 and the second image that has been output to the second display device 30 are to be switched and output while the first image and the second image (e.g., images that are physically one image but have different contents) are output to the first display device 10

(DSP1) and the second display device 30 (DSP2) respectively, and also the scaling (i.e., adjusting the size of the image in accordance with the size of the first display device) for the image to be output to the first display device 10, and the timing synchronization (Timing Sync) and size synchronization (Size Sync) that conform to the characteristics of the first display device are applied, there is an effect in which a switching effect is applied in which the image of the first display device 10 and the image of the second display device 30 move to each other and repeat expanding and contracting without image editing.

As described above, various effects that can be applied directly without image editing allow the gaming display device to have flashy and unique effects.

Third Embodiment

Meanwhile, the hybrid display device H-DSP according to the present embodiment may be further provided with a touch control mode.

In a seventh mode shown in FIG. 12, a touchable display device (or a touchable specific area within the corresponding display device) may be moved and the touchable display device (or the touchable specific area within the corresponding display device) may be displayed in order to prevent a malfunction or operation delay due to an unnecessary touch input when there is no need for each of the display devices 10 and 30 (or a specific area of the corresponding display device) to receive a touch input according to a gaming image (a content) output to the hybrid display device H-DSP (see FIGS. 13A and 13B).

FIGS. 13A and 13B are exemplary diagrams for describing an operation of a seventh mode of moving a touchable area or adjusting a range thereof in the touchable display device or the corresponding display device in FIG. 12.

FIG. 13A is a perspective view of the hybrid display device H-DSP according to the present embodiment, and FIG. 13B is a front view of the hybrid display device H-DSP, and when the seventh mode (i.e., a mode in which a touchable area is moved or a range thereof is adjusted in the touchable display device or the corresponding display device) is selected, the touchable area within the touchable display device or the corresponding display device is displayed.

For reference, the first to seventh modes may be limited to modes that the administrator may select.

As described above, when a hybrid display device is manufactured by combining display devices with different characteristics or specifications, since the present embodiment reflects the characteristics of the combined display devices, it is possible to output an image without visual heterogeneity or to output various image effects suitable for a gaming display directly without image editing.

As described above, when a hybrid display device is manufactured and driven by combining a plurality of display devices with different characteristics and specifications, since the present embodiment enables timing synchronization and size synchronization (Timing & Size Sync) to be applied, it is possible to reduce work time and costs by eliminating the inconvenience of producing a dedicated image (content) for each of the display devices 10 and 30 to operate the conventional hybrid device, and in addition, it is possible for a manager to perform quick installation at the installation site of the hybrid display device by supporting easy control of the hybrid display device.

As described above, embodiments of the present invention has been described with reference to the embodiments shown in the drawings, but this is merely exemplary, and those skilled in the art will understand that various modifications and equivalent other embodiments are possible. Therefore, the technical scope of protection of embodiments of the present invention should be determined by the following patent claims. In addition, the implementations described in the present specification can be implemented as, for example, a method or a process, a device, a software program, a data stream, or a signal. Although described only in the context of the implementation of a single form (e.g., only a method is described), the implementations of the described features may also be implemented in other forms (e.g., a device or a program). The device may be implemented with appropriate hardware, software, firmware, or the like. In embodiments, the method may be implemented in a device, for example, a processor, etc. that generally refers to a processing device including a computer, a microprocessor, an integrated circuit, a programmable logic device, or the like. The processor includes a communication device such as a computer, a cell phone, a portable/personal digital assistant (PDA), and other devices, which facilitate information communication between end-users.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A hybrid display control device comprising:
   a hybrid display device wherein a first display device formed in a central portion and a second display device formed around the first display device are integrally combined;
   an image supply and control computer configured to supply an image to the hybrid display device and control each of the display devices according to a preset mode; and
   a sync control module configured to distribute and provide the image supplied from the image supply and control computer to the first and second display devices, and selectively perform image scaling, timing synchronization, and size synchronization according to a selected mode and characteristics and specifications of each of the display devices;
   wherein, when the image is output to the first display device or the second display device, upon selection of any one of a plurality of modes according to a preset condition,
   according to the selected mode,
   the sync control module selectively applies an animation effect to visually hide a boundary portion between each of the display devices when changing the image output to each of the display devices or changing and outputting the image to each of the display devices.

2. The hybrid display control device of claim 1, wherein the first and second display devices are display devices with different characteristics and specifications and have different resolutions and pixel pitches.

3. The hybrid display control device of claim 1, wherein the sync control module includes a scaler module configured to select a port through which the image is input from the image supply and control computer, convert and output a resolution and convert a physical layer of an input signal, which are suitable for the characteristics of each of the display devices, and adjust a size of the image in accordance with a size of each of the display devices.

4. The hybrid display control device of claim 1, wherein the sync control module includes an image synchronization and distribution module configured to perform timing synchronization conforming to the characteristics of the first display device on the image output to the second display device based on an image input to output response time of each of the display devices.

5. The hybrid display control device of claim 1, wherein the sync control module includes a processor configured to perform size synchronization conforming to the characteristics of the first display device on the image output to the second display device based on a pixel and pitch ratio between each of the display devices.

6. The hybrid display control device of claim 1, wherein the mode is any one of a plurality of modes that is automatically selected or manually selected by a user according to a preset condition including a game event or a screen touch.

7. The hybrid display control device of claim 1, wherein, after storing the image in an internal memory module when the image is input, the sync control module selects a first image to be output to the first display device, performs image synchronization for outputting the first image to an active area of the first display device at normal speed, and transmits the synchronized first image in accordance with an image transmission port of the first display device.

8. The hybrid display control device of claim 7, wherein the sync control module selects a second image to be output to the second display device from the input image and performs image synchronization for outputting the second image to an active area of the second display device at normal speed, performs at least one of image scaling for adjusting a size of the second image in accordance with a size of the second display device, and timing synchronization and size synchronization for conforming to the characteristics of the first display device on the second image, and transmits the second image in accordance with an image transmission port of the second display device.

9. The hybrid display control device of claim 7, wherein the preset condition comprises a game event or a screen touch.

10. The hybrid display control device of claim 1, wherein in order to obtain an effect of a first image being displayed as a continuous image on the first display device and being continuously and naturally connected to the second display device, the sync control module applies all of scaling for the image to be output to the second display device and timing synchronization and size synchronization that conform to the characteristics of the first display device without applying an animation effect as a default mode when the first image is output to the first display device and the second display device.

11. A hybrid display control method comprising:

supplying, by an image supply and control computer of a hybrid display control device, an image to a hybrid display device and controlling each display device according to a preset mode; and distributing and providing, by a sync control module, the image supplied from the image supply and control computer to a first and a second display device of the hybrid display device and selectively performing image scaling, timing synchronization, and size synchronization according to a selected mode and characteristics and specifications of each of the display devices;

wherein, when the image is output to the first display device or the second display device, upon selection of any one of a plurality of modes according to a preset condition, the method further comprises, according to the selected mode, selectively applying, by the sync control module, an animation effect to visually hide a boundary portion between each of the display devices when changing the image output to each of the display devices or changing and outputting the image to each of the display devices.

12. The hybrid display control method of claim 11, wherein the first and second display device are display devices with different characteristics and specifications and have different resolutions and pixel pitches.

13. The hybrid display control method of claim 11, wherein in the selective performing of the image scaling, the timing synchronization, and the size synchronization, the sync control module is configured to:

through a scaler module, select a port through which the image is input, convert and output a resolution and convert a physical layer of an input signal, which are suitable for the characteristics of each of the display devices, and adjust a size of the image in accordance with a size of each of the display devices;

through an image synchronization and distribution module, perform timing synchronization conforming to the characteristics of the first display device on the image output to the second display device based on an image input to output response time of each of the display devices; and through a processor, perform size synchronization conforming to the characteristics of the first display device on the image output to the second display device based on a pixel and pitch ratio between each of the display devices.

14. The hybrid display control method of claim 11, wherein when the image is supplied from the image supply and control computer, the sync control module stores the image in an internal memory module, selects a first image to be output to the first display device, performs image synchronization for outputting the first image to an active area of the first display device at normal speed, and transmits the synchronized first image in accordance with an image transmission port of the first display device.

15. The hybrid display control method of claim 14, wherein after storing the image in the internal memory module, the method further comprises:

by the sync control module, selecting a second image to be output to the second display device from the input image, performing image synchronization for outputting the second image to an active area of the second display device at normal speed, performing at least one of image scaling for adjusting a size of the second image in accordance with a size of the second display device, and timing synchronization and size synchronization for conforming to the characteristics of the first display device on the second image, and then transmitting the second image in accordance with an image transmission port of the second display device.

16. The hybrid display control method of claim 14, wherein the preset condition comprises a game event or a screen touch.

17. The hybrid display control method of claim 11, wherein when distributing and providing the image supplied from the image supply and control computer to the first and second display devices of the hybrid display device, in order to obtain an effect of a first image being displayed as a continuous image on the first display device and being continuously and naturally connected to the second display device, the sync control module applies all of scaling for the image to be output to the second display device and timing synchronization and size synchronization that conform to the characteristics of the first display device without applying an animation effect as a default mode when the first image is output to the first display device and the second display device.

\* \* \* \* \*